(12) United States Patent
Mateo

(10) Patent No.: US 11,199,209 B2
(45) Date of Patent: Dec. 14, 2021

(54) ASSEMBLY BY MECHANICAL CONNECTION INCLUDING AT LEAST ONE PART MADE OF COMPOSITE MATERIAL

(71) Applicant: SAFRAN AIRCRAFT ENGINES, Paris (FR)

(72) Inventor: Julien Mateo, Carignan de Bordeaux (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 190 days.

(21) Appl. No.: 16/777,319

(22) Filed: Jan. 30, 2020

(65) Prior Publication Data
US 2020/0166064 A1 May 28, 2020

Related U.S. Application Data

(62) Division of application No. 15/745,256, filed as application No. PCT/FR2016/051822 on Jul. 15, 2016, now Pat. No. 10,590,972.

(30) Foreign Application Priority Data

Jul. 17, 2015 (FR) ...................................... 1556776

(51) Int. Cl.
*F16B 5/04* (2006.01)
*F16B 5/02* (2006.01)
(Continued)

(52) U.S. Cl.
CPC .............. *F16B 5/0241* (2013.01); *F16B 5/02* (2013.01); *F16B 5/0225* (2013.01); *F16B 5/04* (2013.01);
(Continued)

(58) Field of Classification Search
CPC .... F16B 5/01; F16B 5/0241; F16B 2043/008; F16B 43/00; F16B 5/241; F16B 5/0283; F16B 5/04; F16B 19/02
(Continued)

(56) References Cited

U.S. PATENT DOCUMENTS 2,482,391 A * 9/1949 Webster .............. F16B 19/1027
411/361
2,700,172 A 1/1955 Rohe
(Continued)

FOREIGN PATENT DOCUMENTS

FR 3 007 091 A1 12/2014

OTHER PUBLICATIONS

International Search Report as issued in International Patent Application No. PCT/FR2016/051822, dated Oct. 12, 2016.
(Continued)

*Primary Examiner* — Flemming Saether
(74) *Attorney, Agent, or Firm* — Pillsbury Winthrop Shaw Pittman LLP

(57) ABSTRACT

An assembly includes a first part made of composite material and a second part, which parts are held one against the other by at least one fastener system having a fastener element with a head from which there extends a shank. The fastener system further includes a bushing, the bushing including a collar presenting an inside face and an outside face of conical shape. The head of the fastener element bears against the inside face of the collar, while the outside face of the collar bears against a countersink formed in the first part.

5 Claims, 3 Drawing Sheets

(51) Int. Cl.
*F16B 43/00* (2006.01)
*F16B 5/01* (2006.01)
*F16B 19/02* (2006.01)

(52) U.S. Cl.
CPC ............... *F16B 43/00* (2013.01); *F16B 5/01* (2013.01); *F16B 19/02* (2013.01)

(58) Field of Classification Search
USPC ................................................ 411/531, 501
See application file for complete search history.

(56) References Cited

U.S. PATENT DOCUMENTS

| | | | |
|---|---|---|---|
| 2,967,593 A | 1/1961 | Cushman | |
| 3,724,614 A * | 4/1973 | Bender | ............... F16D 69/0408 |
| | | | 188/218 XL |
| 3,977,146 A | 8/1976 | Wiley | |
| 4,232,496 A | 11/1980 | Warkentin | |
| 4,296,586 A | 10/1981 | Heurteux | |
| 4,650,385 A | 3/1987 | Jackson | |
| 5,022,805 A | 6/1991 | Roberts | |
| 5,299,667 A * | 4/1994 | Hammond | ............... F16D 13/64 |
| | | | 188/218 XL |
| 8,220,222 B2 | 7/2012 | Ciprian | |
| 10,100,859 B2 * | 10/2018 | Savoyat | ............... F16B 19/1027 |
| 2010/0278608 A1 | 11/2010 | Toosky | |
| 2014/0321941 A1 | 10/2014 | Hufenbach | |
| 2014/0369785 A1 | 12/2014 | Revel et al. | |

OTHER PUBLICATIONS

International Preliminary Report on Patentability and then Written Opinion of the International Searching Authority as issued in International Patent Application No. PCT/FR2016/051822, dated Jan. 23, 2018.

* cited by examiner

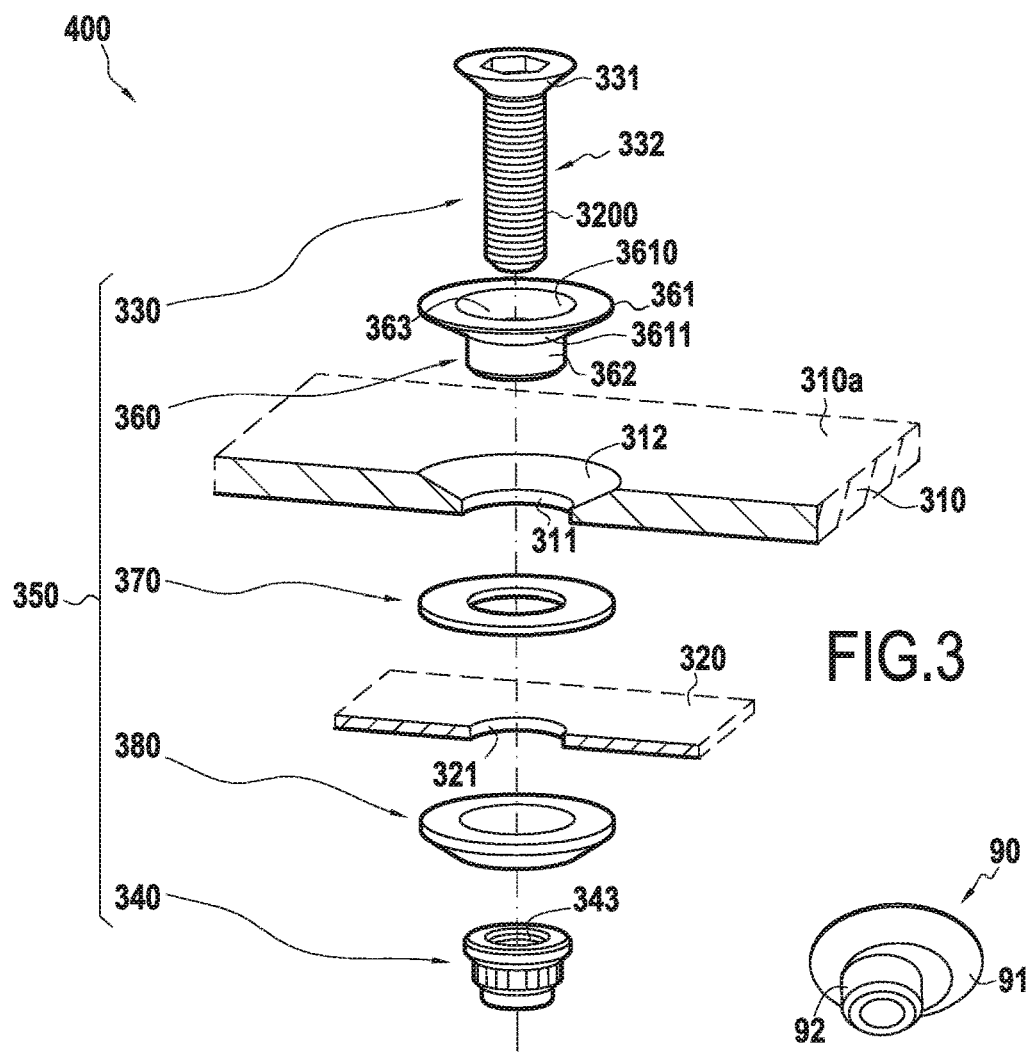
FIG.3
FIG.4
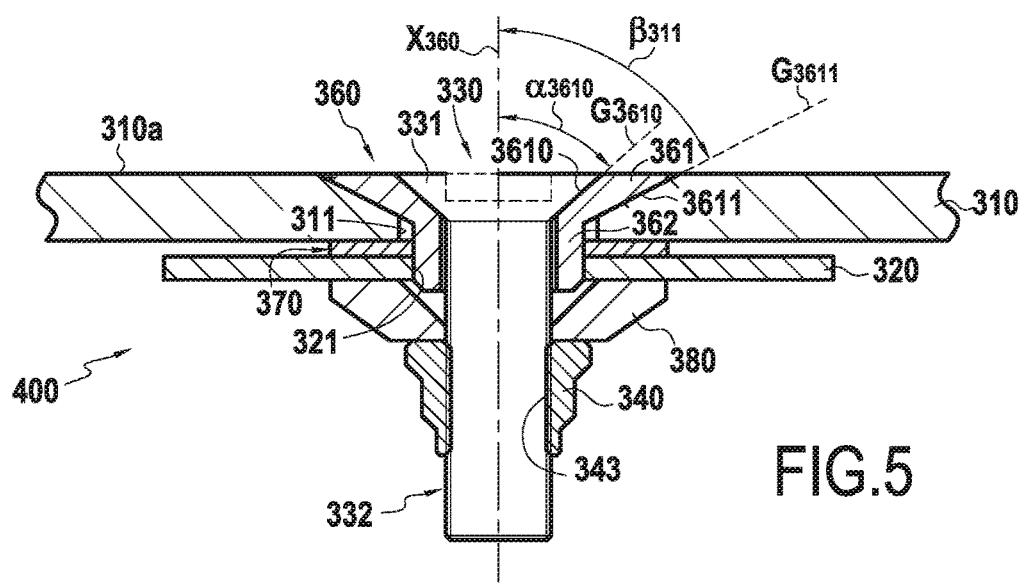
FIG.5

ASSEMBLY BY MECHANICAL CONNECTION INCLUDING AT LEAST ONE PART MADE OF COMPOSITE MATERIAL

CROSS REFERENCE TO RELATED APPLICATIONS

This application is a divisional of U.S. application Ser. No. 15/745,256, filed Jan. 16, 2018, which is the U.S. National Stage of PCT/FR2016/051822 filed Jul. 15, 2016, which in turn claims priority to French Application No. 1556776 filed Jul. 17, 2015. The contents of all applications are incorporated herein by reference in their entirety.

BACKGROUND OF THE INVENTION

The invention relates to using mechanical connection to assemble together parts made of thermostructural composite material, such as a ceramic matrix composite (CMC) material or a carbon-carbon (C/C) material, which material is typically made up of a porous substrate such as a porous fiber substrate, that is densified with a matrix. The fibers of the substrate may in particular be carbon fibers or ceramic fibers. The matrix is a refractory ceramic, such as for example: a carbide, an oxide, a nitride, a boride, or a refractory oxide. Thermostructural composite materials are remarkable for their mechanical properties, which make them suitable for constituting structural elements, and for their ability to retain those properties at high temperatures.

The invention relates more particularly to the mechanical and thermal behavior of mechanical connections used for assembling together parts made of thermostructural composite material when those parts are to be immersed in high temperature streams, as applies for example when fabricating all or some of the afterbody assemblies of an aeroengine such as exhaust cones (also known as "plugs") or flaps for variable-section nozzles, or indeed any other hot fairing such as the aft fairing on a pylon for attaching an engine to an aircraft, known as the aft pylon fairing (APF).

In such applications, the parts that are to be assembled together are generally relatively fine (thickness of a few millimeters) and they need to satisfy aerodynamic requirements, which makes it preferable to use fastener elements of the plane surface or "flush" type in order to make mechanical connections between the parts. For assemblies that are used to make afterbody portions of an aeroengine, it is general practice to use fastener elements that present a flat head at one end of the fastening, which head is received in a countersink formed in one of the parts to be assembled together, and a spacer or a washer at the other end for enabling differential expansion to be taken up between the fastener elements, which expand significantly, and the parts made of thermostructural composite material, which expand less. Incorporating the head of the fastener element flush in a countersink present at one end of the fastening serves to obtain good aerodynamic performance. Nevertheless, the pre-loading or tightening force that is applied to the connection by the fastener element needs to be limited in order to ensure that the parts for assembling together and that are made out of composite material are not damaged by crushing and/or shear.

OBJECT AND SUMMARY OF THE INVENTION

An object of the invention is to propose a solution for assembling at least one part made out of composite material by using one or more fastener systems that present a coefficient of thermal expansion that is greater than the coefficient of thermal expansion of the part(s) made of composite material, with the fastener system being capable of enabling a high pre-loading or tightening force to be used without impacting the mechanical performance of the assembly, thereby improving its capacity for connection.

This object is achieved with an assembly comprising a first part made of composite material and a second part, which parts are held one against the other by at least one fastener system having a fastener element with a head from which there extends a shank, the fastener system also having a bushing, said bushing including a collar presenting an inside face and an outside face of conical shape, the head of the fastener element bearing against the inside face of the collar, while the outside face of the collar bears against a countersink formed in the first part, the assembly being characterized in that the fastener system comprises a screw having a flat head from which there extends a shank provided with a threaded portion and a nut having tapping co-operating with the threaded portion of the screw, the collar presenting an inside face of conical shape that receives the flat head of the screw, the outside face of the collar presenting a cone angle greater than the cone angle of the inside face of said collar.

Thus, by using a bushing with its collar having an outside face presenting a conical shape and extending over a diameter greater than the width or the diameter of the head of the fastener element, the bearing area of the head of the fastener element against the composite material part is increased. This increase in bearing area serves to reduce the crushing pressure and the inter-lamination shear stress in the part, thereby making it possible to increase the tightening force between the parts without the risk of damage, thus increasing the capacity of the connection to take up force. In addition, the fastener system is designed to apply a continuous holding force by radial expansion, thereby serving to compensate for the expansion of each fastener system, in particular its axial expansion, and to conserve a tightening force when hot.

The assembly of the invention is made using mechanical connections that are flush with one side of the assembly, i.e. they do not project beyond the outside surface of one of the assembled-together parts.

Consequently, the assembly of the invention may be immersed on one side in a high temperature stream without aerodynamic performance being degraded as a result of the connection systems.

Since the screw-bushing interface is decoupled from the interface with the part, it is possible to use screws that are standard, i.e. easy and inexpensive to obtain, since the cone angle presented by the inside face of the collar of the bushing can be matched to the cone angle of standard screws without impact on the connection.

In another embodiment of an assembly in accordance with the invention, the fastener system comprises a rivet having a flat head from which there extends a shank having an enlarged end and a first washer including a central countersink against the surface of which the enlarged end of the shank of the rivet rests, the outside face of the collar presenting a cone angle that is greater than the cone angle of the inside face of said collar.

In an aspect of the assembly of the invention, the fastener system further comprises a washer interposed between the facing faces of the first and second parts for assembling together. The washer makes it possible to leave a space between the parts for assembling together in order to control the contact zone in terms of shape, size, and surface state of the contact between the parts. The washer may also have a function of compensating the connection tightening by using an appropriate material for the washer.

In another aspect of the invention, the fastener system further comprises a spacer interposed between the second assembled part and the nut when the fastener system has a screw, or between the second part and the first washer when the fastener system has a rivet, thereby enabling forces to transit between the nut or the first washer and the part while reducing any discontinuities of section modulus. The spacer preferably presents a coefficient of thermal expansion that is greater than the coefficient of thermal expansion of the screw or the rivet in order to maintain the tightening force applied by the connection at all temperature levels.

In another aspect of the assembly of the invention, the second part is made of metal or of composite material.

In yet another aspect of the assembly of the invention, each of the first and second parts presents a thickness of less than 3 millimeters (mm).

In still another aspect of the assembly of the invention, the first and second parts are aeroengine afterbody parts or aerodynamic fairing parts of an aft pylon fairing.

BRIEF DESCRIPTION OF THE DRAWINGS

Other characteristics and advantages of the invention appear from the following description of particular embodiments of the invention given as non-limiting examples and made with reference to the accompanying drawings, in which:

FIG. 3 is a diagrammatic perspective view showing an assembly made in accordance with another embodiment of the invention;

FIG. 4 is a diagrammatic perspective view showing a variant embodiment for the bushing of FIG. 3;

FIG. 5 is a diagrammatic view respectively in section showing the assembly of FIG. 3;

DETAILED DESCRIPTION OF EMBODIMENTS

The present invention applies in general manner to any assembly between parts made of composite material using one or more fastener systems that present a coefficient of thermal expansion greater than the coefficient of thermal expansion of the composite material parts, and in which the fastener system is to have no or very little impact on the aerodynamic performance of the assembly.

The parts to be assembled together may in particular be made of thermostructural ceramic matrix composite (CMC) material, i.e. any material made up of reinforcement made of refractory fibers (carbon fibers or ceramic fibers) densified by a ceramic matrix that is also refractory, such as the following materials: C/SiC, SiC/SiC, C/C—SiC, etc. The parts may equally well be made out of other composite materials presenting a low coefficient of expansion, such as C/C materials (reinforcement and matrix both made of carbon).

The assembly of the invention is particularly, but not exclusively, for use in making all or part of aeroengine afterbody assemblies such as exhaust cones (also known as "plugs"), flaps for variable section nozzles, or aft pylon fairings (APFs).

Figure 1:
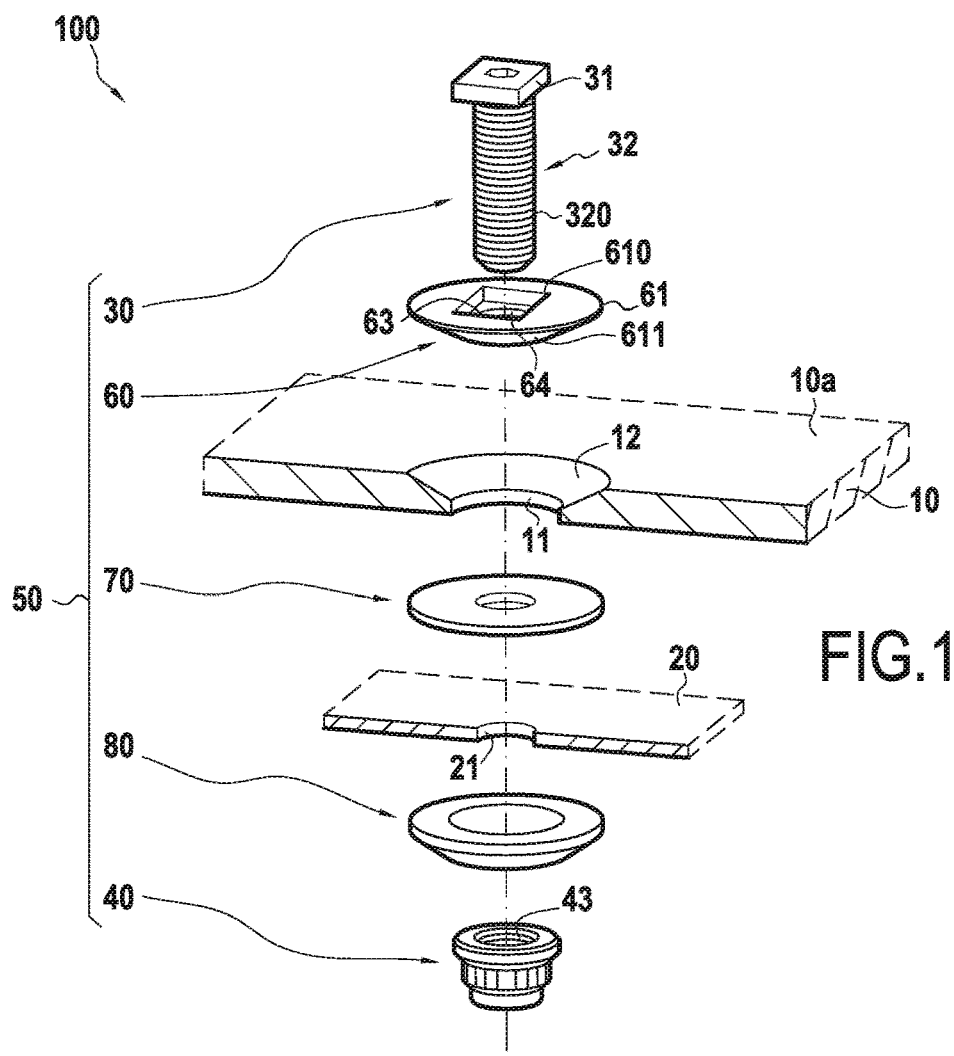
FIG. 1 is a diagrammatic perspective view showing an assembly made in accordance with an embodiment of the invention.
Figure 2:
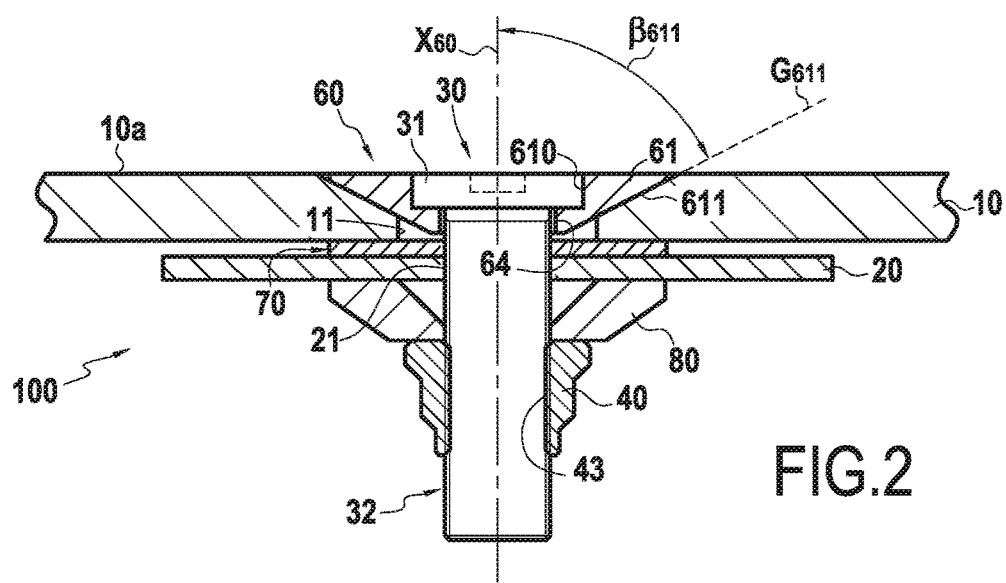
FIG. 2 is a diagrammatic view respectively in section showing the FIG. 1 assembly.

FIGS. 1 and 2 show an assembly in accordance with an embodiment of the invention. As shown in FIG. 1, an assembly 100 between two parts 10 and 20, where the part 10 is made of thermostructural CMC material while the part 20 is made of metal, is implemented by means of a fastener system 50 comprising a screw 30, a nut 40, a bushing 60, a washer 70, and a spacer 80. More precisely, the screw 30 has a square head 31 from which there extends a shank 32 having a threaded portion 320 at its distal end. The nut 40 has tapping 43 for co-operating with the threaded portion 32 of the screw 30.

The bushing 60 has a collar 61 presenting an inside face 610 of square shape matching the shape of the square head 31 of the screw 30, and an outside face 611 of conical shape. The screw 30 and the nut 40 may be made in particular out of any one of the following materials: Inconel® 625 or 718, Waspaloy®, Haynes® 282®, A286 type stainless steel, titanium, TZM (Ti—Zr—Mo) alloy, or any other high performance steel.

As shown in FIG. 2, the collar 61 of the bushing 60 is received in a countersink 12 formed in the part 10, while the shank 32 of the screw 30 passes through orifices 11 and 21 formed respectively in the parts 10 and 20. Inside the bushing 60, the collar 61 defines an inside space 63 that receives the screw 30. The square head 31 of the screw 30 is received in the collar 61 while a proximal portion of the shank 32 is received in an opening 64 formed in the bottom of the inside space 63 of the bushing 60. The parts 10 and 20 are assembled against each other by tightening the nut 40 on the threaded portion 320 of the shank 32 of the screw 30, the spacer 80 being interposed between the nut 40 and the part 20.

The square head 31 of the screw 30 bears against the inside face 610 of the collar 61 of the bushing 60, while the outside face 611 of the collar 61 bears against the countersink 12 formed in the part 10. The outside face 611 of the collar 61 presents a cone angle $\beta_{611}$ corresponding to the angle formed between the axis of revolution $X_{60}$ of the collar and the generator line $G_{611}$ of the outside face 611 of the collar 61.

In accordance with the invention, by using a bushing having its collar with an outside face that is conical in shape, the bearing area of the square head 31 of the screw 30 against the part 10 is increased. This increase in bearing area makes it possible to reduce the crushing pressure and also the inter-lamination shear stress in the part 10 so as to increase the tightening force that can be applied between the parts 10 and 20 without risk of damage, thereby increasing the capacity of the connection for taking up force. In addition, since the screw/bushing interface is decoupled from the interface with the part 10, it is possible to use standard screws, i.e. screws that are easy and inexpensive to obtain.

By way of non-limiting example, the cone angle $\beta_{611}$ of the outside face 611 of the collar may lie in the range 45° to 75°.

The material of the bushing 60 is selected for its coefficient of thermal expansion, which is preferably greater than that of the screw and should serve to compensate in part for the difference in expansion between the composite material and the metal by means of "cone-on-cone" radial expansion that causes radial tension to be applied. The material of the bushing 60 is also selected for its high temperature characteristics. The bushing may in particular be made out of any one of the following materials: Inconel® 625 or 718, Waspaloy®, Haynes® 282®, A286 type stainless steel, titanium, TZM (Ti—Zr—Mo) alloy, or any other high performance steel.

The spacer 80 serves to allow forces to transit between the nut 40 and the part 20, while avoiding discontinuities of section modulus. Nevertheless, the fastener system 50 need not include the spacer 80, in which case the nut 40 would be in direct contact with the part 20. The material of the spacer 80 is selected for its high temperature characteristics and for its coefficient of thermal expansion, which is preferably greater than that of the screw so as to take up in part the difference of expansion between the composite material and the spacer. The spacer may in particular be made out of any one of the following materials: Inconel® 625 or 718, Waspaloy®, Haynes® 282®, A286 type stainless steel, titanium, TZM (Ti—Zr—Mo) alloy, or any other high performance steel.

The washer 70 serves to reserve a space between the parts 10 and 20 for assembling together in order to control the contact zone in terms of shape, of size, and of surface state of the contact between the parts. The washer 70 may also have a function of compensating the tightening of the connection by making the washer of a suitable material such as, for example: Inconel® 625 or 718, Waspaloy®, Haynes® 282®, A286 type stainless steel, titanium, TZM (Ti—Zr—Mo) alloy, or any other high performance steel. The use of the washer 70 is optional in that the fastener system need not include the washer 70, with the parts 10 and 20 then being in direct contact.

By acting as a guide for the screw 30 while tightening the nut 40, the bushing 60 can also serve to center the connection by adding a cylindrical portion (not shown in FIGS. 1 and 2).

As shown in FIG. 2, it can be seen that beside the outside face 10a of the part 10, the head 31 of the screw 30 is fully received in the collar 61, which itself is fully received in the countersink 12, and consequently the head of the screw together with the bushing have very little impact on the aerodynamics of the part 10 (the part has a plane or flush surface). In addition, when the assembly 100 is subjected to high temperatures, e.g. when it is immersed in a hot stream of combustion gas, the radial expansion of the collar 61 serves to maintain contact with the countersink 12, in spite of the axial expansion of the screw 30 (expulsion effect).

FIGS. 3 and 5 show an assembly in accordance with another embodiment of the invention. As shown in FIG. 3, an assembly 400 between two parts 310 and 320, the part 310 being made of CMC material while the part 20 is made of metal, is implemented by means of a fastener system 350 comprising a screw 330, a nut 340, a bushing 360, a washer 370, and a spacer 380. More precisely, the screw 330 has a flat head 331 from which there extends a shank 332 having a threaded portion 3200 at its distal end. The nut 340 has tapping 343 for co-operating with the threaded portion 332 of the screw 330. The bushing 360 has a collar 361 presenting an inside face 3610 and an outside face 3611, each of which is conical in shape. In the presently-described example, the bushing 360 also has a drum 362 extending from the collar 61. The drum 362 is optional, it being possible for the bushing 360 to comprise only the collar 361. The screw 330 and the nut 340 may in particular be made out of any one of the following materials: Inconel® 625 or 718, Waspaloy®, Haynes® 282®, A286 type stainless steel, titanium, TZM (Ti—Zr—Mo) alloy, or any other high performance steel.

As shown in FIG. 5, the collar 361 of the bushing 360 is received in a countersink 312 formed in the part 310, while the drum 362 passes through orifices 311 and 321 formed respectively in the parts 310 and 320. The collar 361 and the drum 362 define an inside space 363 inside the bushing 360 in which the screw 330 is received. The flat head 331 of the screw 330 is received in the collar 361, while a proximal portion of the shank 332 is received in the drum 362. The parts 310 and 320 are assembled against other by tightening the nut 340 on the threaded portion 3200 of the shank 332 of the screw 330, the spacer 380 being interposed between the nut 340 and the part 320.

The flat head 331 of the screw 330 bears against the inside face 3610 of the collar 361 of the bushing 360, while the outside face 3611 of the collar 361 bears against the countersink 312 formed in the part 310. The outside face 3611 of the collar 361 presents a cone angle $\beta_{3611}$ that is greater than the cone angle $\alpha_{3610}$ presented by the inside face 3610 of said collar. The cone angles $\beta_{3611}$ and $\alpha_{3611}$ correspond to the angle formed between the axis of revolution $X_{360}$ of the collar and the respective generator lines $G_{3610}$ and $G_{3611}$ of the inside and outside faces 3610 and 3611 of the collar 361.

In accordance with the invention, by using a bushing having its collar with an outside face of cone angle and diameter greater than the cone angle and diameter of its inside face, the bearing area of the screw head against the part 310 is increased. This increase in bearing area makes it possible to reduce the crushing pressure and also the interlamination shear stress in the part 310 so as to increase the tightening force between the parts 310 and 320 without risk of damage, thereby increasing the capacity of the connection for taking up force. In addition, since the screw/bushing interface is decoupled from the interface with the part 310, it is possible to use standard screws, i.e. screws that are easy and inexpensive to obtain, since the cone angle $\alpha_{3610}$ presented by the inside face 3610 can match the cone angle of standard screws without any impact on the connection.

By way of non-limiting example, the cone angle $\alpha_{3610}$ of the inside face 3610 of the collar 361 may lie in the range 30° to 60°, while the cone angle $\beta_{3611}$ of the outside face 3611 of the collar may lie in the range 45° to 75°.

The material of the bushing 360 is selected for its high temperature characteristics and for its coefficient of thermal expansion, which is preferably greater than that of the screw and should serve to compensate in part for the difference in expansion between the composite material and the metal by means of "cone-on-cone" radial expansion that causes radial tension to be applied. The bushing may in particular be made of any one of the following materials: Inconel® 625 or 718, Waspaloy®, Haynes® 282®, A286 type stainless steel, titanium, TZM (Ti—Zr—Mo) alloy, or any other high performance steel.

The spacer 380 serves to cause forces to transit between the nut 340 and the part 320, while avoiding any discontinuities of section modulus. Nevertheless, the fastener system 350 need not include the spacer 380, in which case the nut 340 would be in direct contact with the part 320. The material of the spacer 380 is selected for its high temperature characteristics and for its coefficient of thermal expansion, which is preferably greater than that of the screw so as to take up in part the difference of expansion between the composite material and the spacer. The spacer may in particular be made out of any one of the following materials: Inconel® 625 or 718, Waspaloy®, Haynes® 282®, A286 type stainless steel, titanium, TZM (Ti—Zr—Mo) alloy, or any other high performance steel.

The washer 370 serves to reserve a space between the parts 310 and 320 for assembling together in order to control the contact zone in terms of shape, of size, and of surface state of the contact between the parts. The washer 70 may also have a function of compensating the tightening of the connection by making the washer out of a suitable material such as, for example: Inconel® 625 or 718, Waspaloy®, Haynes® 282®, A286 type stainless steel, titanium, TZM (Ti—Zr—Mo) alloy, or any other high performance steel.

The use of the washer 70 is optional in that the fastener system need not include the washer 70, with the parts 10 and 20 then being in direct contact.

By acting as a guide for the screw 30 while tightening the nut 40, the bushing 60 can also serve to center the connection when it is provided with a cylindrical portion such as the drum 362.

In the variant embodiment shown in FIG. 4, the fastener system of the invention may include a bushing 90 with its drum 92 located eccentrically relative to its collar 91. Such a bushing serves to take up clearance during tightening with screws having shanks that are not in axial alignment with their screw heads.

As shown in FIG. 5, it can be seen that beside the outside face 310a of the part 310, the head 331 of the screw 330 is fully received in the collar 361, which is itself fully received in the countersink 312, and consequently the head of the screw and the bushing have very little impact on the aerodynamics of the part 310 (the part has a plane or flush surface). In addition, when the assembly 400 is subjected to high temperatures, e.g. when it is immersed in a hot stream of combustion gas, the radial expansion of the collar 361 serves to maintain contact with the countersink 312, with this applying in spite of the axial expansion of the screw 330 (expulsion effect).

Figure 6:
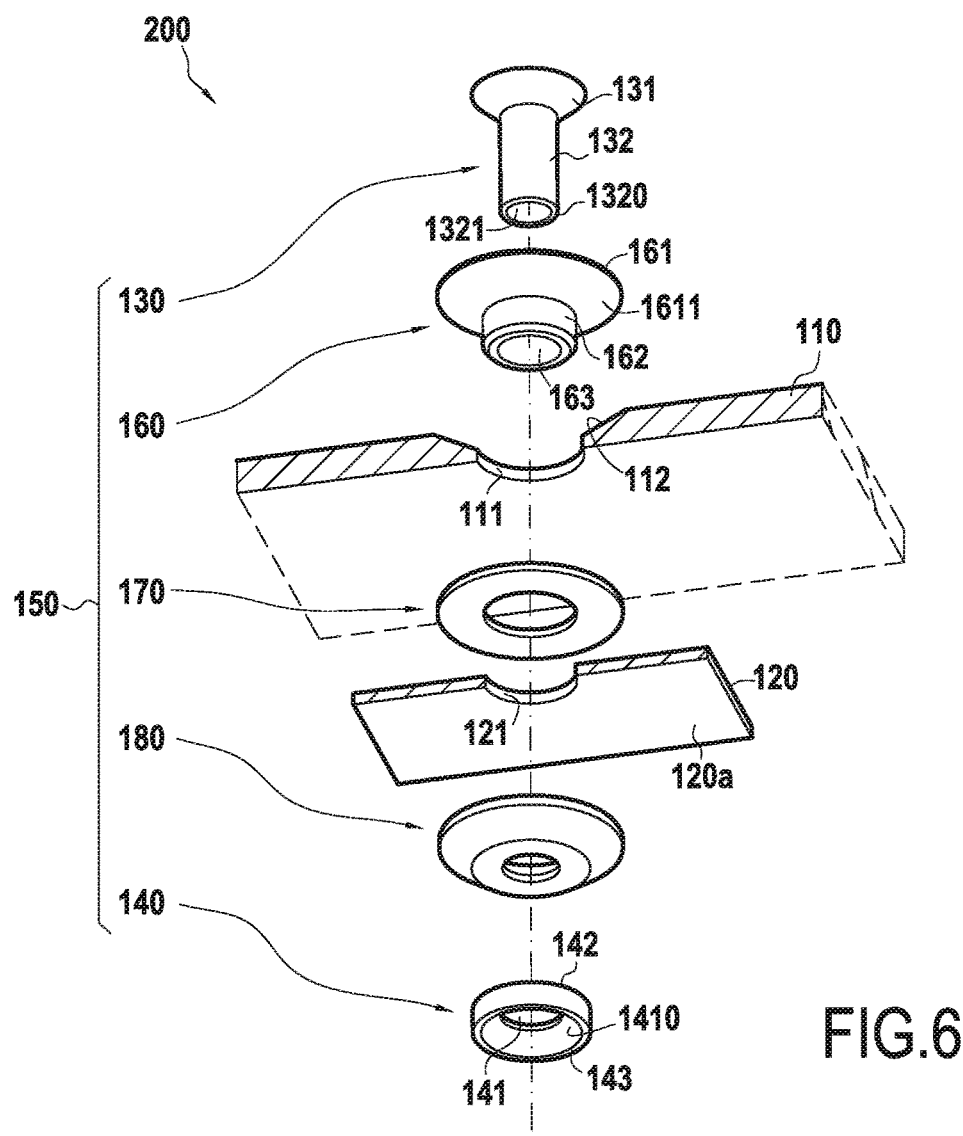
FIG. 6 is a diagrammatic perspective view showing an assembly made in accordance with another embodiment of the invention.
Figure 7:
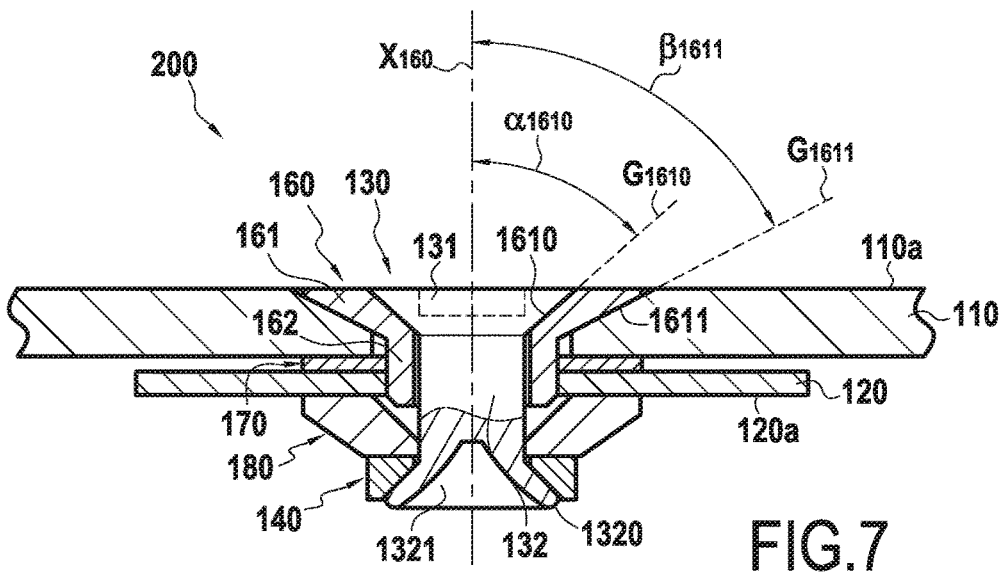
FIG. 7 is a diagrammatic section view showing the FIG. 6 assembly.

FIGS. 6 and 7 show an assembly in accordance with another embodiment of the invention. As shown in FIG. 6, an assembly 200 between two parts 110 and 120, the part 110 being made of CMC material while the part 120 is made of metal, is implemented by means of a fastener system 150 comprising a rivet 130, a first washer 140, a bushing 160, a second washer 170, and a spacer 180. More precisely, the rivet 130 has a flat head 131 from which there extends a shank 132. The washer 140 has a central opening 141 for receiving the free end 1320 of the shank 132. The washer 140 also has both a plane first face 142 that is to be pressed against the spacer 180 or the outside surface 120a of the second part 120 if there is no spacer 180, and also a second face 143. The central opening 141 in the washer 140 includes a countersink 1410. The rivet 130 and the washer 140 may in particular be made out of any one of the following materials: Inconel® 725 or 718, Waspaloy®, Haynes® 282®, A286 type stainless steel, titanium, TZM (Ti—Zr—Mo) alloy, or any other high performance steel.

As shown in FIG. 7, the collar 161 of the bushing 160 is received in a countersink 112 formed in the part 110, while the drum 162 passes through orifices 111 and 121 formed respectively in the parts 110 and 120. The collar 161 and the drum 162 define an inside space 163 inside the bushing 160 in which the rivet 130 is received. The flat head 131 of the rivet 130 is received in the collar 161, while a proximal portion of the shank 132 is received in the drum 162. The free end 1320, which includes a central recess 1321, is enlarged by flattening so as to press the edges of the end 1320 against the countersink 1410 of the central opening 141 in the washer 140. The free end may be enlarged either when hot or when cold, depending on the material constituting the rivet, and by using a riveting head. The two parts 110 and 120 are then secured together by riveting. The rivet 130 could be replaced by a blind rivet (of the lock-bolt type).

The flat head 131 of the rivet 130 bears against the inside face 1610 of the collar 161 of the bushing 160, while the outside face 1611 of the collar 161 bears against the countersink 112 formed in the part 110. The outside face 1611 of the collar 161 presents a cone angle $\beta_{1611}$ and a diameter that are greater than the cone angle $\alpha_{1610}$ and the diameter presented by the inside face 1610 of said collar. The cone angles $\beta_{1611}$ and $\alpha_{1610}$ correspond to the angle formed between the axis of revolution $X_{160}$ of the collar and the respective generator lines $G_{1610}$ and $G_{1611}$ of the inside and outside faces 1610 and 1611 of the collar 161.

In accordance with the invention, by using a bushing with its collar having an outside face with a cone angle and a diameter that are greater than the cone angle and the diameter of its inside face, the bearing area of the head of the rivet against the part 110 is increased. This increase in bearing area makes it possible to reduce the crushing pressure and also the inter-lamination shear stress in the part 110 so as to increase the tightening force between the parts 110 and 120 without risk of damage, thereby increasing the capacity of the connection for taking up force.

By way of non-limiting example, the cone angle $\alpha_{1610}$ of the inside face 1610 of the collar 161 may lie in the range 30° to 60°, while the cone angle $\beta_{1611}$ of the outside face 1611 of the collar may lie in the range 45° to 75°.

The material of the bushing 160 is selected for its high temperature characteristics and for its coefficient of thermal expansion, which is preferably greater than that of the screw and should serve to compensate in part for the difference in expansion between the composite material and the metal by means of "cone-on-cone" radial expansion that causes radial tension to be applied. The bushing may in particular be made out of any one of the following materials: Inconel® 725 or 718, Waspaloy®, Haynes® 282®, A286 type stainless steel, titanium, TZM (Ti—Zr—Mo) alloy, or any other high performance steel.

The spacer 180 serves to cause forces to transit between the washer 140 and the part 120, while avoiding any discontinuities in section modulus. Nevertheless, the fastener system 150 need not include the spacer 180, in which case the washer 140 would be in direct contact with the part 120. The material of the spacer 180 is selected for its high temperature characteristics and for its coefficient of thermal expansion, which is preferably greater than that of the screw so as to take up part of the difference of expansion between the composite material and the spacer. The spacer may in particular be made out of any one of the following materials: Inconel® 725 or 718, Waspaloy®, Haynes® 282®, A286 type stainless steel, titanium, TZM (Ti—Zr—Mo) alloy, or any other high performance steel.

The second washer 170 serves to reserve a space between the parts 110 and 120 for assembling together in order to control the contact zone in terms of shape, of size, and of surface state of the contact between the parts. The washer 170 may also have a function of compensating the tightening of the connection by making the washer out of a suitable material, such as for example: Inconel® 625 or 718, Waspaloy®, Haynes® 282®, A286 type stainless steel, titanium, TZM (Ti—Zr—Mo) alloy, or any other high performance steel. The use of the washer 170 is optional in that the fastener system need not include the washer 170, with the parts 110 and 120 then being in direct contact.

As shown in FIG. 7, it can be seen that beside the outside face 110a of the part 110, the head 131 of the rivet 130 is fully received in the collar 161, which is itself fully received in the countersink 112, and consequently the head of the rivet and the bushing have very little impact on the aerodynamics of the part 110 (the part has a plane or flush surface). In addition, when the assembly 200 is subjected to high temperatures, e.g. when it is immersed in a hot stream of combustion gas, the radial expansion of the collar 161 serves to maintain contact with the countersink 112, with this applying in spite of the axial expansion of the rivet 130. A similar compensation effect takes place at the enlarged end portion 1320 of the rivet 130 in contact with the countersink 1410 in the opening 141 of the washer 140.

The invention claimed is:

1. An assembly comprising a first part made of composite material and a second part, which first and second parts are held one against the other by at least one fastener system having a fastener element with a head from which there extends a shank, the fastener system also having a bushing, said bushing including a collar presenting an inside face and an outside face of conical shape, the head of the fastener element bearing against the inside face of the collar, while the outside face of the collar bears against a countersink formed in the first part, wherein the fastener system comprises a rivet having a flat head from which there extends a shank having an enlarged end and a first washer including a central countersink against the surface of which the enlarged end of the shank of the rivet rests, the collar of the bushing presenting an inside face of conical shape receiving the flat head of the rivet, and wherein the outside face of the collar presents a cone angle that is greater than the cone angle of the inside face of said collar, wherein the fastener system further comprises a flat washer interposed between the facing faces of the first and second parts, wherein the bushing has a drum that extends through said flat washer, and wherein the second part is made of composite material.

2. An assembly according to claim 1, wherein the fastener system further comprises a spacer interposed between the second part and the first washer.

3. An assembly according to claim 2, wherein the spacer presents a coefficient of thermal expansion that is greater than the coefficient of thermal expansion of the rivet.

4. An assembly according to claim 1, wherein each of the first and second parts presents a thickness of less than 3 mm.

5. An assembly according to claim 1, wherein the first and second parts are aeroengine afterbody parts or aerodynamic fairing parts of an aft pylon fairing.

* * * * *